Jan. 16, 1962 R. BARGMANN 3,016,913
EXPLOSION SAFETY VALVES, ESPECIALLY FOR MARINE ENGINES
Filed Feb. 25, 1958

INVENTOR
Richard Bargmann
BY
Michael S. Striker
Attorney ns with the latest regulations of the insurance and classification companies, the equipment of diesel engines, especially the large units operating on the two-stroke cycle principle as used in marine engineering, must include special safety valves on the crank case to ensure against explosions.

3,016,913
EXPLOSION SAFETY VALVES, ESPECIALLY FOR MARINE ENGINES
Richard Bargmann, Schongau, Germany
(Heigerleinstrasse 106, Vienna 17, Austria)
Filed Feb. 25, 1958, Ser. No. 717,412
Claims priority, application Germany Feb. 25, 1957
3 Claims. (Cl. 137—312)

In accordance with the latest regulations of the insurance and classification companies, the equipment of diesel engines, especially the large units operating on the two-stroke cycle principle as used in marine engineering, must include special safety valves on the crank case to ensure against explosions.

The valves must allow large quantities of gas to blow-off suddenly from the crank chamber due to combustion impulses, without fresh air being sucked into the crank case in any appreciable quantities during the subsequent closure of the valve.

These valves must consequently open spontaneously and then close very quickly, controlling large cross-sectional areas. The moved valve parts must therefore be constructed as far as possible without bulk. Moreover the auxiliary means for closing the valves must themselves also be constructed as light as possible yet be extremely effective.

Furthermore, it is necessary for the valve plate to be guided free from friction, without jamming in the event of sudden and in some cases one-sided gas pressures, without too strong spring action impeding the opening and without allowing the valve plate to close inaccurately.

The combination with a simple or far-reaching protection against flash or flame is at the same time just as important as the possibility of returning the leakage oil. The parts which move precipitantly should not operate without being covered in.

None of the existing constructions completely satisfy these requirements. Thus solutions of the problem are known in which flat or domed valve plates with numerous radial reinforcement ribs carry a central guide sleeve which is loaded by a restoring spring. The guide sleeve itself is guided in a second sleeve with a similar rib star. This in itself results not only in considerable weight but there is also the possibility of jamming in the event of a one-sided gas pressure thrust.

On the other hand constructions are known in which the guiding of the valve plate is to be effected by a long leaf spring. Apart from the fact that the majority of the above mentioned requirements are not met with this arrangement and there is an exposed movable part which might endanger the operators, the construction of such springs for rapid and strong closing movements yet with the necessary high lift is extremely difficult and in order to close cleanly must be combined with joint arrangements so that, in the event of a one-sided gas thrust, any soft packing material used, for example, can be torn out.

Finally, plate valves operating as relief valves are known in which an absolutely flat valve plate loaded by a spring is used which moves between the valve seat and a valve arrester, whereby a stiff steel leaf spring located between the valve plate and the spiral spring acts as damper during the last portion of the plate stroke.

All these and similar constructions do not, however, meet some of the important requirements indicated and are, moreover, expensive to manufacture. The arrangement hereinafter described by way of example does, however solve the problem in an extremely practical and simple manner with a minimum outlay.

The object of the invention is to produce a safety valve against explosion, especially for marine engines, with a flat or slightly profiled valve plate operating between the valve seat and a cover plate or arrester, the valve plate being, for example, conical on its outer periphery in the direction towards the valve seat and having in the middle a shallow recess in which the last coil of a spiral spring fits. The cover plate is of dish-shape with downwardly bent edge or rim. A ring in which a soft packing is embedded, serves as valve seat and directly welded on to the crank case. This ring carries stay bolts for holding the cover plate. In an alternative solution of the problem the valve seat is detachably and removably connected with a counter-ring on the inner side of the crank case wall, for example, by means of the stay bolts which carry the cover plate. These stay bolts form a cage for the valve plate which is otherwise only guided by the spiral spring.

For large valve cross-sections it is advisable to provide an additional highly heat-conductive flame arrester which can be fitted either in the crank case or outside thereof between the valve seat and the cover plate, the stay bolts or reinforcement ribs serving at the same time as valve plate guide cage. A wire or strip fabric is used as protection against flash and explosion. Grooves cut in seat ring or welded on plates or sections are used as oil collectors.

Several embodiments of the invention are illustrated by way of example in the accompanying drawing, in which.

Figure 1:
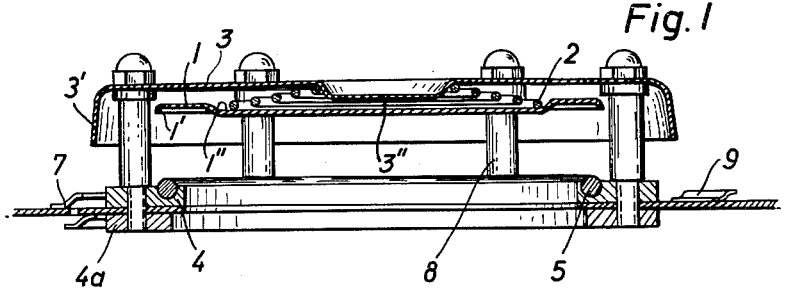
FIG. 1 shows a form of construction of the valve for bolting on the crank case.
Figure 2:
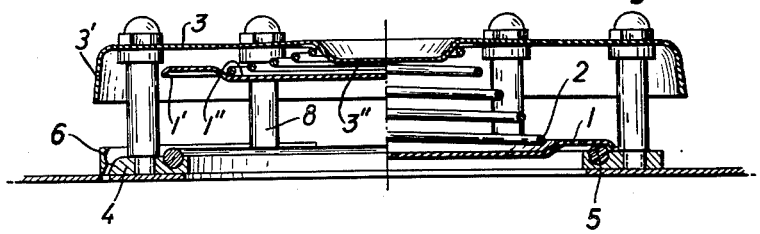
FIG. 2 is a form of construction with weld connection between the crank case and the valve.

The valve plate 1 is loaded by a spiral spring 2 which in turn bears against a cover or stop plate 3. A valve seat ring 4 is located on the crank case, which ring can, if necessary, be secured to a counter-ring 4a in the interior of the crank case by means of bolts or rivets. Soft packings, for example in the form of gasket rings 5 seal off the valve plate in closed position towards the crank case. For leading off any overflowing oil, either a channel 6 is cut in the valve seat ring 4 or a separate guide plate 7 is provided. Channel 6 or guide plate 7 respectively extend, when the valve is mounted on a substantially vertical wall, that is when the valve axis is substantially horizontal, only about a portion of the valve seat ring and located below the horizontal valve axis. In this case a guide section 9 may also be provided to deflect any oil flowing along the wall away from the valve seat ring 4. The stay bolts 8 hold the cover plate 3 and at the same time guide the valve plate 1 (FIGS. 1 and 2).

Figure 3:
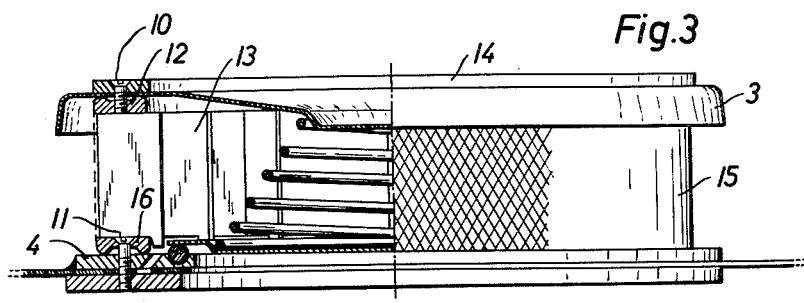
FIG. 3 shows a construction with external flash arresting arrangements in the form of trellis or wire netting.

In the construction illustrated in FIG. 3, two rings 12 and 16 are provided which are connected by radially directed plates (ribs) 13 and attached to the valve seat 4 and to a ring 14 resting on the cover plate 3, by means of screws 10 and 11 respectively. A lattice 15 serving as flame protector is placed around the whole valve between the seat ring and the cover plate.

All constructional parts for guiding the valve plate 1, that is the spiral spring 2 and the stay bolts 8 or ribs 13 for fixing the cover plate, are arranged outside the passage cross-sectional area of the valve seat and therefore do not reduce this area. This is an important advantage over other constructions.

The valve plate is profiled in order to increase its rigidity. The valve plate 1 has an edge 1', which is, for example, conical and directed downwardly towards the crank case. The loading spring for the valve plate is a spiral spring 2 which, owing to the high specific efficiency of this type of spring and to its light weight, is particularly suitable for the purpose in question. The spring bears without any intermediate members at one end against the cover plate 3 about a central base 3″ of the latter protecting the moving parts and at the other end against the bottom of a shallow recess 1″ in the valve plate in which the last coil of the spiral fits. By means of the deflecting edge 1′ which is slightly bent downwards the valve seat any explosion flash spreading along the valve plate is deflected at the edge 1′ towards the crank case walls and becomes absolutely harmless for the operators. By the suitable arrangement and selection of the cross-sectional area, considerable expansion and cooling of the outflowing hot gases can be effected, which, particularly in the construction illustrated in FIG. 3, in which a more intensive effect is attained by supplementary protection against flame, is of considerable importance for very large units. The stop plate 3 is likewise formed with a flange 3′ directed toward the valve seat.

The valve seat 4 in all the forms of construction consists of a simple steel ring which is either connected to a counter-ring 4a in the crank case by means of a few bolts 8, or, what is more simple, more practical for packing and lighter, is welded directly on to the cover plates of the crank case (FIG. 2). In the latter case, however, it is no longer possible to completely dismantle the valve. The actual gasket ring 5 is let into this ring. An important feature of the connecting means is that the bolts, which are for example screwed or riveted, serve at the same time for limiting the movement of the valve plate which is otherwise freely movable, with the result that on the one hand resistance to movement is avoided and on the other hand jamming or wedging is reliably prevented. The arrangement of a protection against oil leakage, either by cutting a channel 6 in the seat ring or by special guide plates 7 or 9, is extremely simple and effective.

In the event of a pressure thrust from the crank case, the valve plate will in every case strike against the cover plate serving simultaneously as arrester and protection of movement, and directly thereafter will, due to the minimum masses in question and the cushioning effect of the gasket ring free from any frictional hindrance, close immediately and promptly without fluttering.

Instead of the external flash arrester 15, a wire netting or grid may be arranged inside the crank case in front of the outlet for the gas or flame in the valve.

Finally both internal and external flame arresters may be fitted.

I claim:

1. An explosion safety valve comprising, in combination, annular valve seat means; a plurality of elongated supports distributed along, fixed to, and extending axially from one side of said valve seat means, said supports being arranged distant from each other to provide relatively large free spaces between themselves and said supports having free ends distant from said valve seat means; a substantially continuous stop plate extending between and fixed to said supports adjacent the free ends thereof so as to leave said spaces between said supports unobstructed at least in the region of said valve seat means, said stop plate having a peripheral flange extending toward said valve seat means and surrounding sid supports and said stop plate being formed with a substantially central boss likewise directed toward said valve seat means; a valve plate formed from sheet metal and offset in the central region thereof for stiffening the plate and so as to form a central recess facing said stop plate, said valve plate being located between said stop plate and valve seat means for movement toward a closed position engaging the latter and away from the latter toward the stop plate to an open position, said peripheral flange of said stop plate adapted to direct flames when said valve plate is in its open position back toward said valve seat means, said plurality of supports being located beyond said valve plate and spaced therefrom; and a coil spring having at one end a convolution engaging said stop plate about said central boss and at its opposite end a convolution engaging said valve plate and located in said recess so that said spring urges said valve plate to its closed position.

2. A valve as recited in claim 1 and wherein said valve plate has at its periphery a flange directed toward said valve seat means.

3. A valve as recited in claim 1 and wherein a channel means at least partly surrounds said valve seat means to direct fluid back toward the latter.

References Cited in the file of this patent

UNITED STATES PATENTS

| 1,238,334 | Raub | Aug. 28, 1917 |
| 1,897,076 | Shand | Feb. 14, 1933 |
| 1,959,644 | Richardson | May 22, 1934 |
| 2,005,469 | Nelson | June 15, 1935 |
| 2,388,395 | Duggan | Nov. 6, 1945 |
| 2,520,771 | Martin | Aug. 29, 1950 |
| 2,694,411 | Ponsar | Nov. 16, 1954 |
| 2,787,127 | Benz | Apr. 2, 1957 |

FOREIGN PATENTS

| 657,043 | Germany | Feb. 23, 1938 |
| 195,483 | Switzerland | May 2, 1938 |
| 922,645 | Germany | Jan. 20, 1955 |